United States Patent [19]

Rinn et al.

[11] Patent Number: 4,529,154

[45] Date of Patent: Jul. 16, 1985

[54] DEVICE FOR DERIVATION OF TEMPORARY FORCE FOR MAINTAINING A DISPLAYABLE APPENDIX IN ITS STORED POSITION ON A SPACE VEHICLE

[75] Inventors: Christian Rinn; Georges Marello; Gérard Vezain, all of Alpes Maritimes, France

[73] Assignee: Societe Nationale Industrielle Aerospatiale, Paris, France

[21] Appl. No.: 518,269

[22] Filed: Jul. 28, 1983

[30] Foreign Application Priority Data

Jul. 30, 1982 [FR] France .................. 82 13361

[51] Int. Cl.³ .................................. B64G 1/66
[52] U.S. Cl. ...................... 244/158 R; 244/173; 16/374
[58] Field of Search ............ 244/173, 158 R; 16/374, 16/375, 376; 343/DIG. 2, 915, 881, 840

[56] References Cited

U.S. PATENT DOCUMENTS

| | | | |
|---|---|---|---|
| 167,576 | 9/1875 | Skidmore | 16/375 |
| 1,246,246 | 11/1917 | Dickerson | 16/374 |
| 1,612,656 | 12/1926 | NeeLevy | 16/374 |
| 2,498,558 | 2/1950 | Lantz | 16/374 |
| 3,175,081 | 3/1965 | Schaefer | 16/374 |
| 4,133,501 | 1/1979 | Penlicki | 244/173 |

FOREIGN PATENT DOCUMENTS

| | | | |
|---|---|---|---|
| 3215432 | 10/1983 | Fed. Rep. of Germany | 244/173 |
| 269005 | 4/1927 | United Kingdom | 16/376 |
| 844290 | 8/1960 | United Kingdom | 16/374 |

Primary Examiner—Galen L. Barefoot
Attorney, Agent, or Firm—Karl W. Flocks; Sheridan Neimark; A. Fred Starobin

[57] ABSTRACT

A displayable appendix linked to the structure of a space vehicle movable about an articulation axis from a stored position along the structure of the space vehicle to a display position by a control mechanism with abutments on the appendix and on the structure of the space vehicle so distributed and located as to prevent warping or distortion of the articulation axis and the control mechanism by exerting upon the appendix bending prestresses which are reduced near the articulation axis to a pure prestress torque tending to cause the appendix to move to the display position and temporary forces obtained from use of the abutments to hold the displayable appendix in the stored position during launch of the space vehicle.

12 Claims, 10 Drawing Figures

DEVICE FOR DERIVATION OF TEMPORARY FORCE FOR MAINTAINING A DISPLAYABLE APPENDIX IN ITS STORED POSITION ON A SPACE VEHICLE

This invention relates to devices for maintaining in a stored position on a structure an appendix displayable about a hinging axis. It is more particularly applicable to displayable appendices mounted to space vehicles. Such vehicles use appendices (solar generators, reflectors, masts, telecommunication equipments, and the like) which are to be stored on the actual body of the vehicles during the launching phase.

The significant sizes of such appendices require that they be folded back to accommodate the volume permitted by the launchers.

During the launching phase such objects are maintained to the body of the vehicle through several temporary securing points to which there are added the connection point or points of the appendix to the vehicle which remain after dispalying thereof. Such permanent connection points generally comprise orientation or positioning mechanisms for the appendices which allow them to fulfil their task in the orbit.

Such launching configuration meets the following requirements:
volume (launcher)
geometric dimensions (interface with the satellite)
functioning (displaying of the appendix)
mechanical behaviour
rigidity.

The rigidity requirement is intended to provide frequency decoupling between the launcher, the satellite and appendices, to limit the loads and thus to permit realization of minimum mass elements.

In view of the sizes of the elements and the required frequencies it is necessary to multiply the holding points. Therefore it is required that the permanent connection point for the appendix to the satellite should be a holding point which is capable of absorbing loads induced thereinto by the launching.

Such loads are heavier than the loads exerted on such points when the satellite is in orbit. Therefore it is necessary to also dimension the orientation mechanism with reference to the launching loads, thereby unavoidably causing significant loss in useful mass and volume in the vehicle.

Nowadays there are various orientation mechanisms in which a blocking or locking mechanism is incorporated, the unlocking command being realized by pyrotechnic control after displaying of the appendix.

There is known for example a temporary locking device for a rotary element relative to a fixed structure, such as described in the Applicants' U.S. application Ser. No. 133,997 filed on Mar. 26, 1980 for application to an inertial wheel which however requires a particular order of operation and the blocking of which is integrated into the pivoting device.

There are also known devices for maintaining a storage container for displayable and orientable solar pannels; for example a solution described in the Applicant's French Pat. No. 2.470.727.(79 29.681) consists of locking each of the hinge connections of a displayable arm, thereby multiplying the number of orders to transmit for releasing the displaying device, and not providing an optimum rigidity.

The object of this invention is to remedy such drawbacks and it is intended in particular for maximum preservation of the control (orientation and/or positioning) mechanisms by deriving all or part of the temporary forces exerted on the appendices during the launching phases directly into the vehicle structure without allowing them to pass through the control mechanism as in the prior art devices.

In the domain of space applications there is also proposed according to the invention a device for deriving a temporary force for maintaining in a stored position on a space vehicle structure an appendix displayable about an articulation axis under the effect of a control mechanism which is intended for mechanically relieving the latter and is characterized in that it comprises holding means external to the control mechanism adapted to apply to the appendix in said stored position longitudinal bending prestresses reduced near the articulation axis to a simple prestress torque tending to cause displaying of the appendix.

The invention proposes more particularly a device for derivation of a temporary force of the above mentioned type, characterized in that the means for holding the appendix comprise a first group of abutments, fastened to the structure, a second group of abutments fastened to the appendix and at least a temporary locking means connecting the appendix and the structure in spaced relationship from the articulation axis, such abutments being disposed in such way that in the stored position of the appendix, during the locking of said means, each of the abutments of the first group distributed into two sub-groups disposed along the articulation axis on either parts of the control mechanism is pressed against one of the abutment of the second group also distributed into two sub-groups disposed along the articulation axis on either parts of the control mechanism.

In a preferred mode of realization such a device comprises two abutments in each of the sub-groups, diametrically opposite relative to the articulation axis. The face to face joining surfaces of the abutments are for example planar and coplanar, transmitting tangential forces from the appendix to the structure, either by dry friction or by shearing or partial embedding of the abutments, and the centering of the abutments relative to the articulation axis can be provided by edge portions or elements of revolution secured to the abutments and symmetrical relative to the articulation axis.

In view of the fact that the holding means are external to the control mechanism and produce only a simple torque in the supports of the fixed abutments, they provoke a strong reduction if not a suppression of the forces exerted on the control mechanism during the launching phase. Moreover, the great simplicity of the device, due to its substantially static nature, makes it very reliable; no unlocking control must be provided at the abutments, and thus the articulation axis, since the abutments facing each other separate upon displaying the appendix and leave the appendix an angular extent of motion which is the more significant the smaller the number of abutments. The unlocking can now be obtained responsive to a single order issued to the mentioned complementary locking means for example through a pyrotechnic phenomenon. When the abutments are all situated in one plane, the displaying of the appendix enables the orientation control mechanism to perform its function.

It is to be noted that this invention, moreover, permits to provide great rididity in the stored appendix.

Moreover, according to the invention, the control mechanisms can be better standardized since the selection thereof no longer requires preliminary calculation of the temporary loads that would be exerted thereon upon the launching.

Other characteristics and advantages of this invention will appear from the following description of a device for deriving a temporary force which is given by way of non limitative example with reference to the attached drawings, in which.

In the various exemplifying forms of embodiment illustrated in FIGS. 1 to 5, 7 and 8, a displayable appendix 1 is hinged about an articulation axis 10 under the action of a control mechanism 2 covered by a cap. In view of the fixed reference trihedron (X, Y, Z) selected, the articulation axis 10 is parallel to axis Z in the stored position of the appendix. Such articulation axis is moreover rotatably mounted, which is not forcibly the case with all the appendices to which the invention is applicable, about a rotary axis 11 substantially parallel to the orientation pivoting axis Y responsive to the control mechanism 2.

Figure 1:
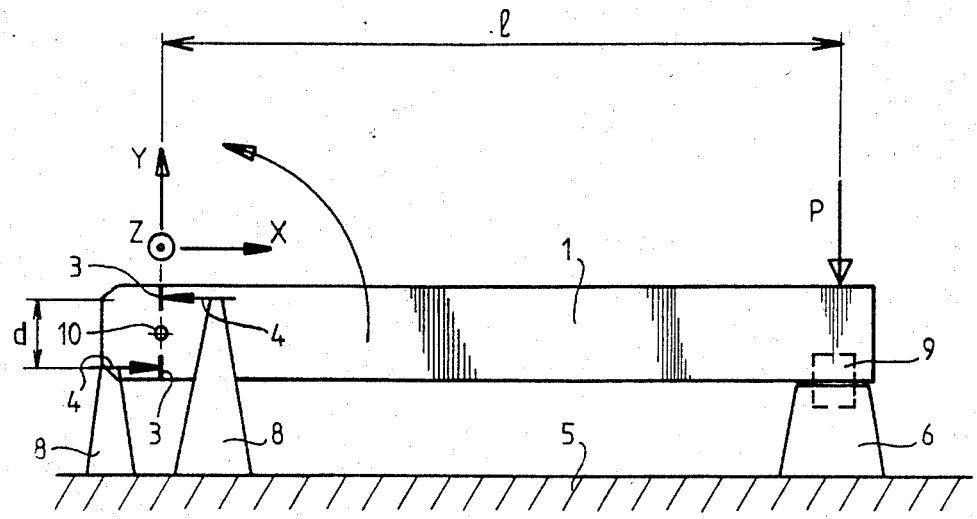
FIG. 1 is a lateral schematic view of an appendix in a folded back position provided with a device according to the invention.
Figure 2:
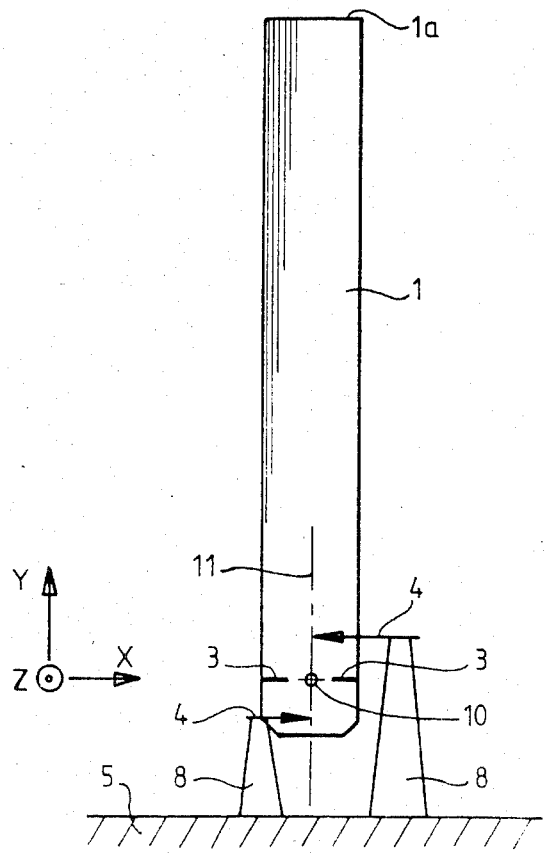
FIG. 2 is a schematic lateral view of the appendix of FIG. 1 in the displayed position.

As appears from the conceptual FIGS. 1 and 2, one can distinguish two groups of abutments, depending on whether they are fixed or movable. Fixed abutments 4 (shown by arrows) forming a first group are fastened to a structure 5 in parallel to which the appendix 1 is folded back in the stored position by means of uprights 8. Such abutments 4 are distributed into two sub-groups disposed along the articulation axis 10 on either side of the control mechanism 2. Movable abutments 3 forming a second group are fastened to the appendix 1 and are disposed on either side of the latter and of the control mechanism along the articulation axis 10.

In the form of embodiment illustrated in FIGS. 1 and 2, the abutments in each sub-group are two in number, planar and moreover radial, coplanar and diametrically opposite to one another. It will be shown further on that such configuration is not necessarily present notwithstanding the advantages offered thereby.

In the stored condition (FIG. 1) the fixed abutments 4 and the movable abutments 3 are applied to one another. The positioning of such abutments is such as to provoke, upon the utilization of complementary temporary locking means 9 providing for temporary fixation of the appendix 1 on a base 6 fastened to the vehicle structure 5, the occurrence of longitudinal bending prestresses in the plane XY which are reduced near the articulation axis 10 to a simple prestress torque tending to provoke displaying of the appendix. As a matter of fact, the major part of the stresses in the appendix 1 close to the articulation axis are tractive compressive stresses which are balanced out by the reactions of the fixed abutments 4. The shearing stress is transmitted to the fixed abutments 4 through contact with the movable abutments 3. Therefore, no radial force is induced thereby relative to the axis. The articulation axis consequently does not run the risk of being warped or distorting the control mechanism 2 to which it is connected.

The locking means 9 is not described in detail since the characteristics thereof do not belong to this application. They are for example conventional pyrotechnic means disposed in parallel to the axis Z between appendix 1 and base 6, the latter then having flanges rising on either parts of the appendix to serving as supports for said means. Ignition of such pyrotechnic means or the unlocking of means 9 automatically provides for separation of the fixed and movable abutments, which therefore do not require specific unlocking devices.

FIG. 2 represents the appendix 1 in the displayed position. It has undergone a rotation of 90° relative to the position thereof in FIG. 2, and lies parallel to the axis Y of the reference trihedron. Although such configuration is advantageous, since it brings the free end 1a of appendix to a maximum distance from structure 5, obviously it does not correspond to the single medium operative position that such an appendix may take according to the invention.

Due to the 90° rotation of appendix 1, the common plane of movable abutments 3 has also undergone a 90° rotation about the articulation axis 10 and lies perpendicular to the rotational axis 11. The fixed abutments 4 and the movable abutments 3 cannot therefore come into reciprocable contact in such a configuration, upon rotation of appendix 1 about the rotational axis 11, such rotation being then limited only by the possibilities offered by the control mechanism 2. Such configuration enables the appendix to rotate about axis Y due to the absence of fixed abutments in the volume swept by the movable abutments upon such rotations. This remark can be generalized for any number of abutments in each sub-group. Such possibilities of rotation are particularly advantageous in application to satellite solar pannels. As a matter of fact, said pannels must be oriented facing the sum, whereas the satellite body to which they are maintained by their orientation mechanism must be oriented towards the earth to permit communications. It is noted that the above-described device effectively provides the necessary motion when the axis Y is approximately aligned with the rotational axis of the orientation mechanism 2.

In the stored configuration (FIG. 1) forces induced within the appendix are transmitted, in particular due to the inertia thereof, most often and almost totally, if the arrangement and dimensioning of the abutments is appropriate, directly to the structure 5 through the fixed 4 and movable 3 abutments and the uprights 8 thereof. The dimensioning, the arrangement and the number of such uprights are optional provided that they become capable of transmitting temporary forces.

The face to face joining pressure between abutments must correspond to maximum forces that may appear for fear of reducing the quality of force derivations parallel to plane YZ which are effected in the face to face joining plane of the abutments. If P designates the force applied to the appendix at complementary temporary locking member 9, l the deviation between the base 6 and the articulation axis 10, and d the average distance between the abutments in one and the same sub-group, the face to face joining pressure between abutments depends on:

$$P \cdot l/d$$

Derivation of forces $F_{YZ}$ parallel to the plane YZ can be realized in several manners, most often through dry friction or reciprocal embedding of the facing abutments, as is mentioned hereinbelow relative to the forms of embodiment illustrated in FIGS. 3 to 10. In all these examples of embodiment the fixed abutments 4 are carried by two uprights 8 disposed on either parts of the control mechanism 2 but it is noted again that such number is optional.

Figure 3:
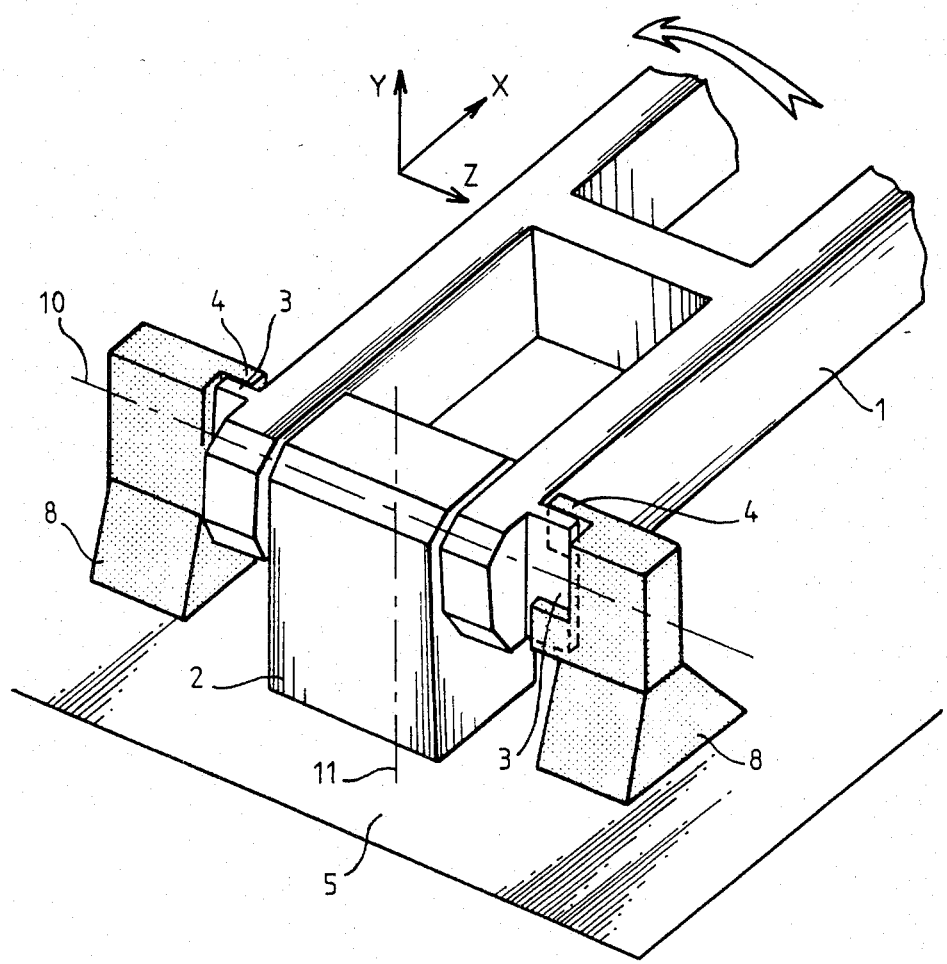
FIG. 3 is a perspective view of an appendix in the folded back position provided with a device according to the invention.

The form of embodiment illustrated in FIG. 3 corresponds to a derivation of the temporary forces $F_{YZ}$ parallel to the plane YZ through dry friction. If Cf is the friction coefficient between abutments, such forces are correctly derived towards the structure on the condition that they correspond to the following inequality:

$$F_{YZ} < 2 \cdot C_f \cdot P \cdot l/d$$

Obviously it is advantageous to provide abutments having a high frictional coefficient or to apply a suitable coating thereon.

The abutments are shown as simple projections from the uprights 8 and the appendix 1 in parallel to the articulation axis 10. It is to be noted that the movable abutments 3 on the one and the same side of the appendix are not differentiated from one another since they are formed from a portion of a plate perpendicular to the longitudinal axis of the appendix and extending the articulation axis 10.

Figure 4:
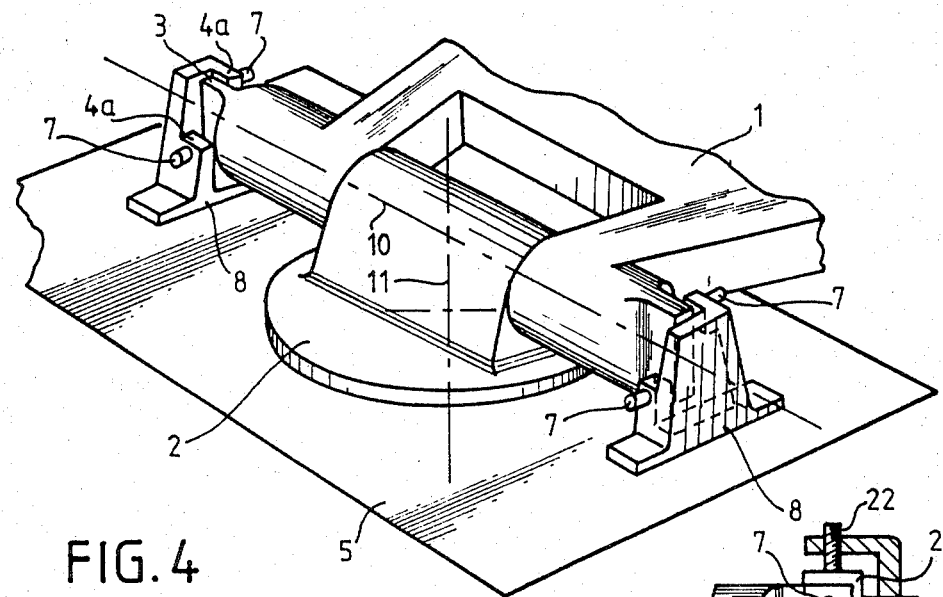
FIGS. 4 and 5 are perspective views of another form of embodiment of the device according to the invention in respective locked and unlocked positions.
Figure 5:
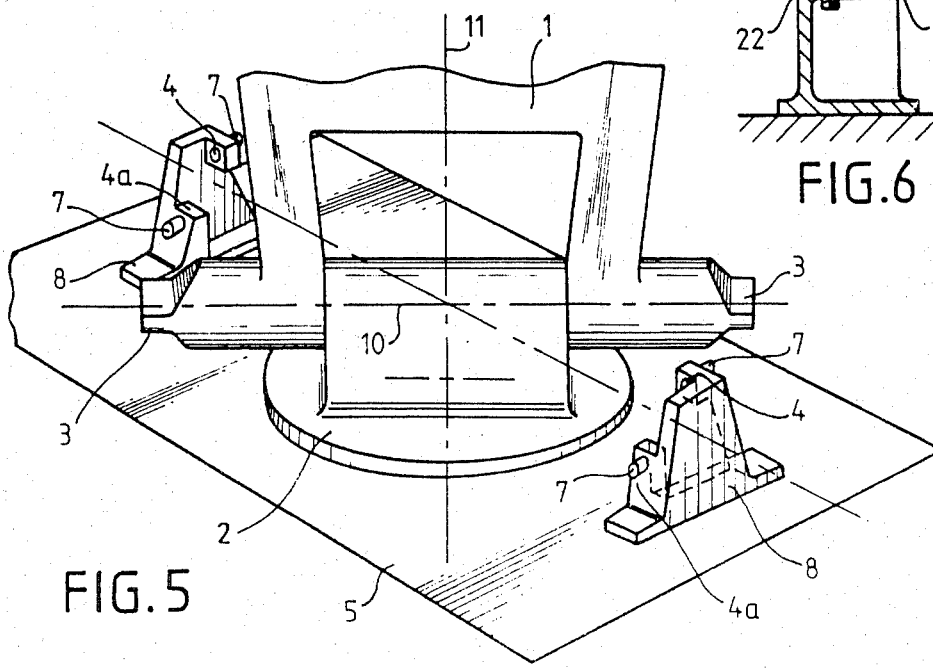

FIGS. 4 and 5 illustrate a structure for holding the appendix which much resembles the preceding one. Many variations of form have been provided. It is to be noted in particular that the fixed abutments 4 are formed here by the flat head of added members such as screws 7 crossing protuberances 4a parallel to axis Z, similar to those constituting the fixed abutments in FIG. 3.

Figure 6:
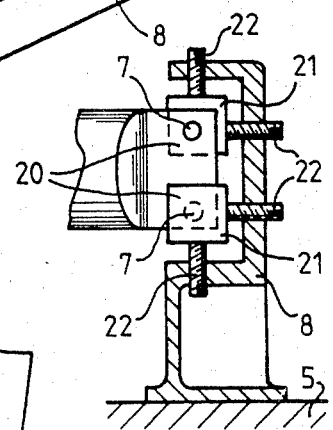
FIG. 6 is a detailed lateral view of another form of embodiment (in cross-section)

FIG. 6 illustrates by way of example several optional peripheral means adapted to provide mutual wedging of the abutments without untimely gliding of one relative to the other. When the immobilization is not ensured by friction, there can be advantageously provided plates 20 adjustable by wedging screws 7 and 22 comprising edge portions 21 to permit the appendix to be held into abutment without sliding relative to the structure. It is required to select for such a plate 20 a material that will not be welded by diffusion under vacuum to the other contacting element. Its surface turned towards the movable abutments 3 may moreover be in contact with the upper part of such abutments and/or constitute a cylinder portion centered to the axis 10 and adapted to provide initial guiding on the displaying.

Figure 7:
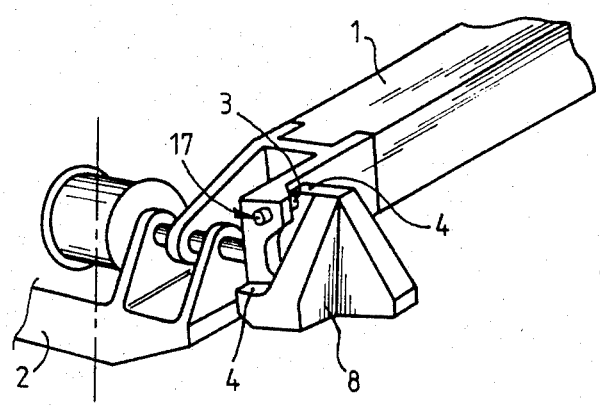
FIGS. 7 and 8 are perspective views of still another form of embodiment of a device according to the invention, in respective locked and unlocked positions.
Figure 8:
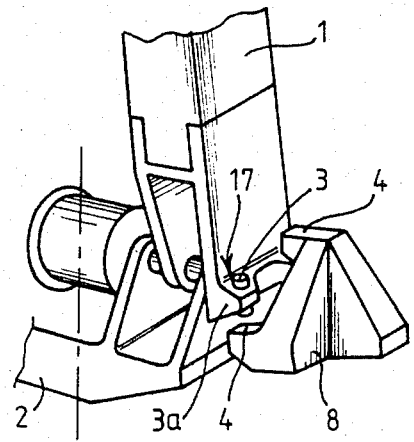

FIGS. 7 and 8 illustrate a mode of realization of the derivation according to the invention which substantially differs from that of FIGS. 4 and 5 in that the adjustment of the face to face joining surfaces of the associated abutments is ensured by means of screws 17, added on not to the fixed uprights 8 but to the appendix 1. The face to face joining surfaces are the flat heads 3a of screws 17 and the abutments 4.

Figure 9:
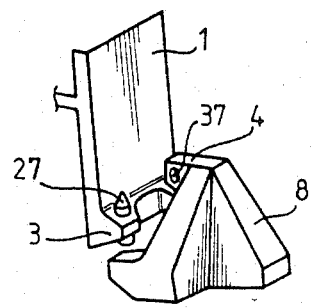
FIG. 9 is a perspective view of a detail of a device according to another form of embodiment of the invention.

FIG. 9 illustrate a mode of realization according to the invention wherein the derivation of forces parallel to plane YZ is no longer ensured only by a dry frictional effect but also due to the shearing strength of pawns 27 carried by one of the abutments movable in the proposed example of embodiment, which are adapted to temporarily fit in cavities or channels 37 of a complementary shape; a position adjustment of pawns 27 or of cavity 37 in a plane parallel to YZ is obviously advantageous for maximum utilization of such insertable elements.

Figure 10:
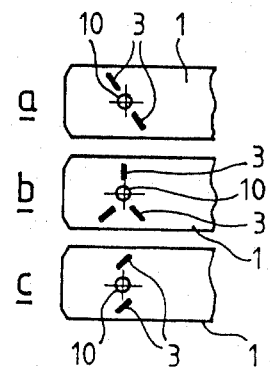
FIGS. 10a, 10b, 10c are schematic variations for the arrangement of abutments.

FIG. 10 schematizes several possible variations for arranging the movable abutments 3 related to the appendix 1. In FIG. 10a the abutments are two in number; their surfaces facing the fixed abutments 4 are coplanar with the articulation axis 10 according to a plane the articulation of which relative to plane YZ is advantageously selected such that the maximum temporary forces to be derived are perpendicular to said facing surfaces. FIG. 10b shows an arrangement having at least three radial abutments in each sub-group; derivation of the forces is moreover obtained through dry friction, the facing surfaces then not being coplanar; such derivation is also facilitated due to the increased number of abutments. FIG. 10c proposes an arrangement with two non radial but parallel abutments. It is to be noted that the multiplication of the abutments does not facilitate the production of a rotation of the appendix about its axis, after the displaying thereof without any limitation through contact of fixed and movable abutments. It may be remarked that in each of said FIGS. 10a to 10c, the bending of the appendix induces a pure torque in the neighborhood of the articulation axis 10.

It will be understood that many variations of the arrangement, number and nature of the abutments can be proposed by combining or not the preceding ones without departing from the scope of the invention. The facing surfaces might also not be planar to present for example complementary projections (such as pyramids and the like) periodically or no distributed. They may be inclined relative to each of the three axes. They may have curves shapes such as portions of surfaces of revolution (spheres, cones) the axes of which are parallel to the reactions of application onto the abutments.

The derivation obtained by means of a device according to the invention is obviously the more effective the more rigidly the abutments are connected to the appendix and to the structure.

Furthermore the number of securement bases is optional.

It will also be understood that this invention was only described and represented in a purely explanatory and not at all limitative manner and that technical equivalents can be substituted for its constituents without departing from the scope of the invention, which is defined in the appended claims.

We claim:

1. In a space vehicle having a space vehicle structure with a displayable appendix provided at one end with an articulation axis about which the appendix can be displayed from a stored position of said appendix on said structure of the space vehicle and a control mechanism for displaying said appendix about said axis from said stored position; a device for derivation of temporary force for maintaining said appendix in said stored position on said structure of the space vehicle comprising holding means external to said control mechanism for exerting upon the appendix longitudinal bending prestresses reduced about the articulation axis to a pure prestress torque tending to cause displaying of the appendix, said holding means for the appendix including

- a first group of abutments fastened to the structure and distributed into two sub-groups disposed along the articulation axis on either side of the control mechanism;
- a second group of abutments fastened to the appendix and distributed into two sub-groups disposed along the articulation axis on either side of the control mechanism; and
- at least one temporary locking means connecting the appendix and the structure at a distance from the articulation axis, such abutments of the first and second groups being disposed so that in the stored position of the appendix upon the locking thereof each of the abutments of the first group is pressed towards an abutment of the second group, whereby said articulation axis and said control mechanism are mechanically relieved by derivation of the temporary forces exerted on the appendix in its stored position through said holding means.

2. A device for derivation of temporary force according to claim 1 wherein each of the sub-groups comprises two abutments diametrically opposite relative to the articulation axis.

3. A device for derivation of a temporary force according to claim 1 wherein some abutments at least in first and second groups of abutments comprise face to face joining surfaces with high frictional coefficient.

4. A device for derivation of a temporary force according to claim 1 wherein the abutments have planar face to face joining surfaces.

5. A device for derivation of a temporary force according to claim 4 wherein said face to face joining surfaces of at least a portion of the abutments are coplanar with the articulation axis of the appendix.

6. A device for derivation of a temporary force according to claim 4 wherein said face to face joining surfaces of the abutments are parallel to one another and are of a predetermined inclination with respect to the structure, in the stored position, depending on the orientation of the forces to be derived.

7. A device for derivation of a temporary force according to claim 4 wherein the face to face joining surfaces of at least three abutments are radial relative to the articulation axis so that dry friction is produced.

8. A device for derivation of temporary force according to claim 1 wherein at least two of the abutments intended for face to face joining comprise complementary fitting in means.

9. A device for derivation of a temporary force according to claim 1 wherein at least determined abutments comprise peripheral wedging members for preventing the face to face joining surfaces thereof from sliding relative to one another.

10. A device for derivation of a temporary force according to claim 1 wherein at least one of the abutments comprises means for relative adjustment with the abutments to which it is confronted in the stored position of the appendix.

11. In a space vehicle having a space vehicle structure with a displayable appendix provided at one end with an articulation axis about which the appendix can be displayed from a stored position of said appendix on said structure of the space vehicle and a control mechanism for displaying said appendix about said axis from said stored position; a device for derivation of temporary force for maintaining said appendix in said stored position on said structure of the space vehicle comprising holding means external to said control mechanism for exerting upon the appendix longitudinal bending prestresses reduced about the articulation axis to a pure prestress torque tending to cause displaying of the appendix, said holding means for the appendix including

- a first group of abutments fastened to the structure and distributed into two sub-groups disposed along the articulation axis on either side of the control mechanism;
- a second group of abutments fastened to the appendix and distributed into two sub-groups disposed along the articulation axis on either side of the control mechanism; and
- at least one temporary locking means connecting the appendix and the structure at a distance from the articulation axis, such abutments of the first and second groups being disposed so that in the stored position of the appendix upon the locking thereof each of the abutments of the first group is pressed towards an abutment of the second group, the articulation axis of the appendix is itself movable about a rotational axis perpendicular thereto, wherein the geometric arrangement of the abutments and the number thereof are such that when brought into alignment with said rotational axis the appendix is adapted to rotate about itself without the abutments of one group being brought into abutment with an abutment of the other group, whereby said articulation axis and said control mechanism are mechanically relieved by derivation of the temporary forces exerted on the appendix in its stored position through said holding means.

12. A device for derivation of a temporary force according to claim 11 for holding an appendix which in the stored position is perpendicular to the rotational axis of its articulation axis wherein each of the sub-groups comprises two abutments diametrically opposite relative to the articulation axis and situated in one and the same plane perpendicular to the appendix in the stored position.

* * * * *